US012613182B2

(12) United States Patent
Chubachi et al.

(10) Patent No.: US 12,613,182 B2
(45) Date of Patent: Apr. 28, 2026

(54) CONCENTRATION MEASUREMENT DEVICE

(71) Applicant: SONY GROUP CORPORATION, Tokyo (JP)

(72) Inventors: Hideya Chubachi, Tokyo (JP); Tetsuro Kuwayama, Tokyo (JP); Yoshiaki Kato, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 175 days.

(21) Appl. No.: 18/572,800

(22) PCT Filed: Feb. 8, 2022

(86) PCT No.: PCT/JP2022/004787
§ 371 (c)(1),
(2) Date: Dec. 21, 2023

(87) PCT Pub. No.: WO2023/276230
PCT Pub. Date: Jan. 5, 2023

(65) Prior Publication Data
US 2024/0337587 A1 Oct. 10, 2024

(30) Foreign Application Priority Data

Jun. 29, 2021 (JP) ................................. 2021-108087

(51) Int. Cl.
*G01N 21/05* (2006.01)
*G01N 21/03* (2006.01)
*G01N 21/59* (2006.01)
(52) U.S. Cl.
CPC ......... *G01N 21/05* (2013.01); *G01N 21/0303* (2013.01); *G01N 21/59* (2013.01); *G01N 2021/052* (2013.01)

(58) Field of Classification Search
CPC ............. G01N 2021/052; G01N 21/01; G01N 21/0303; G01N 21/05; G01N 21/59
See application file for complete search history.

(56) References Cited

U.S. PATENT DOCUMENTS

| | | | |
|---|---|---|---|
| 4,654,535 A | 3/1987 | Wolske | |
| 4,797,000 A | 1/1989 | Curtis | |

(Continued)

FOREIGN PATENT DOCUMENTS

| | | | | |
|---|---|---|---|---|
| CN | 112067581 B | * | 9/2024 | ......... G01N 21/0303 |
| JP | 2009-510475 A | | 3/2009 | |

(Continued)

OTHER PUBLICATIONS

International Search Report and Written Opinion of PCT Application No. PCT/JP2022/004787, issued on Mar. 22, 2022, 08 pages of ISRWO.

*Primary Examiner* — Hina F Ayub
(74) *Attorney, Agent, or Firm* — CHIP LAW GROUP

(57) ABSTRACT

Provided is a concentration measurement device that includes a light source that emits light, a first optical system that is provided on an optical path of the light emitted from the light source and condenses the light emitted from the light source, a light-transmissive tubular body that is disposed at a position on a rear stage side with respect to a focal position of the first optical system on the optical path and collimates the light incident on a side surface in a state where a fluid flows inside, and a detection unit that detects light through the tubular body.

9 Claims, 10 Drawing Sheets

(56)     References Cited

U.S. PATENT DOCUMENTS

| | | | | |
|---|---|---|---|---|
| 2005/0037384 A1* | 2/2005 | Braig | G01N 21/0303 | |
| | | | | 435/6.12 |
| 2010/0184061 A1* | 7/2010 | Kataoka | G01N 15/1459 | |
| | | | | 435/6.12 |
| 2016/0202164 A1* | 7/2016 | Trainer | G01N 15/0211 | |
| | | | | 356/336 |
| 2019/0301929 A1 | 10/2019 | Huang et al. | | |
| 2022/0252468 A1* | 8/2022 | Kowalski | G01N 25/4873 | |
| 2022/0381672 A1* | 12/2022 | Pecker | G01N 33/491 | |

FOREIGN PATENT DOCUMENTS

| | | |
|---|---|---|
| JP | 2016-024093 A | 2/2016 |
| JP | 2016-223878 A | 12/2016 |
| WO | WO-2009001868 A1 | 12/2008 |

* cited by examiner

6101
LIGHT
IRRADIATION
UNIT

6102
DETECTION
UNIT

6103
INFORMATION
PROCESSING
UNIT

6104
SORTING
UNIT

CONCENTRATION MEASUREMENT DEVICE

CROSS REFERENCE TO RELATED APPLICATIONS

This application is a U.S. National Phase of International Patent Application No. PCT/JP2022/004787 filed on Feb. 8, 2022, which claims priority benefit of Japanese Patent Application No. JP 2021-108087 filed in the Japan Patent Office on Jun. 29, 2021. Each of the above-referenced applications is hereby incorporated herein by reference in its entirety.

Field

The present disclosure relates to a concentration measurement device.

Background

Conventionally, a concentration measurement device has been known that includes a resin tube, a light source that emits light toward a fluid in the resin tube, and a light receiving element that receives light through the resin tube, and measures the concentration of the fluid by employing the Beer-Lambert law (See, for example, Patent Literature 1).

Citation List

Patent Literature

Patent Literature 1: JP 2016-223878 A

Summary

Technical Problem

However, in the concentration measurement device described in Patent Literature 1, the light emitted from the light source and passing through the resin tube is emitted in a diffused state. That is, a part of the light through the resin tube travels in a direction not reaching the light receiving element, and is not detected by the light receiving element.

Therefore, in the concentration measurement device described in Patent Literature 1, the amount of light detected by the light receiving element cannot be sufficiently secured, and the measurement accuracy may be lowered.

Therefore, the present disclosure relates to a concentration measurement device capable of improving the measurement accuracy.

Solution to Problem

According to the present disclosure, a concentration measurement device is provided that includes: a light source that emits light; a first optical system that is provided on an optical path of the light emitted from the light source and condenses the light emitted from the light source; a light-transmissive tubular body that is disposed at a position on a rear stage side with respect to a focal position of the first optical system on the optical path and collimates the light incident on a side surface in a state where a fluid flows inside; and a detection unit that detects light through the tubular body.

BRIEF DESCRIPTION OF DRAWINGS

FIG. 7 is a diagram illustrating a configuration of a biological sample analyzer.

FIG. 10 is a diagram illustrating a configuration of a measurement device main body according to a third embodiment of the present disclosure.

DESCRIPTION OF EMBODIMENTS

Figure 1:
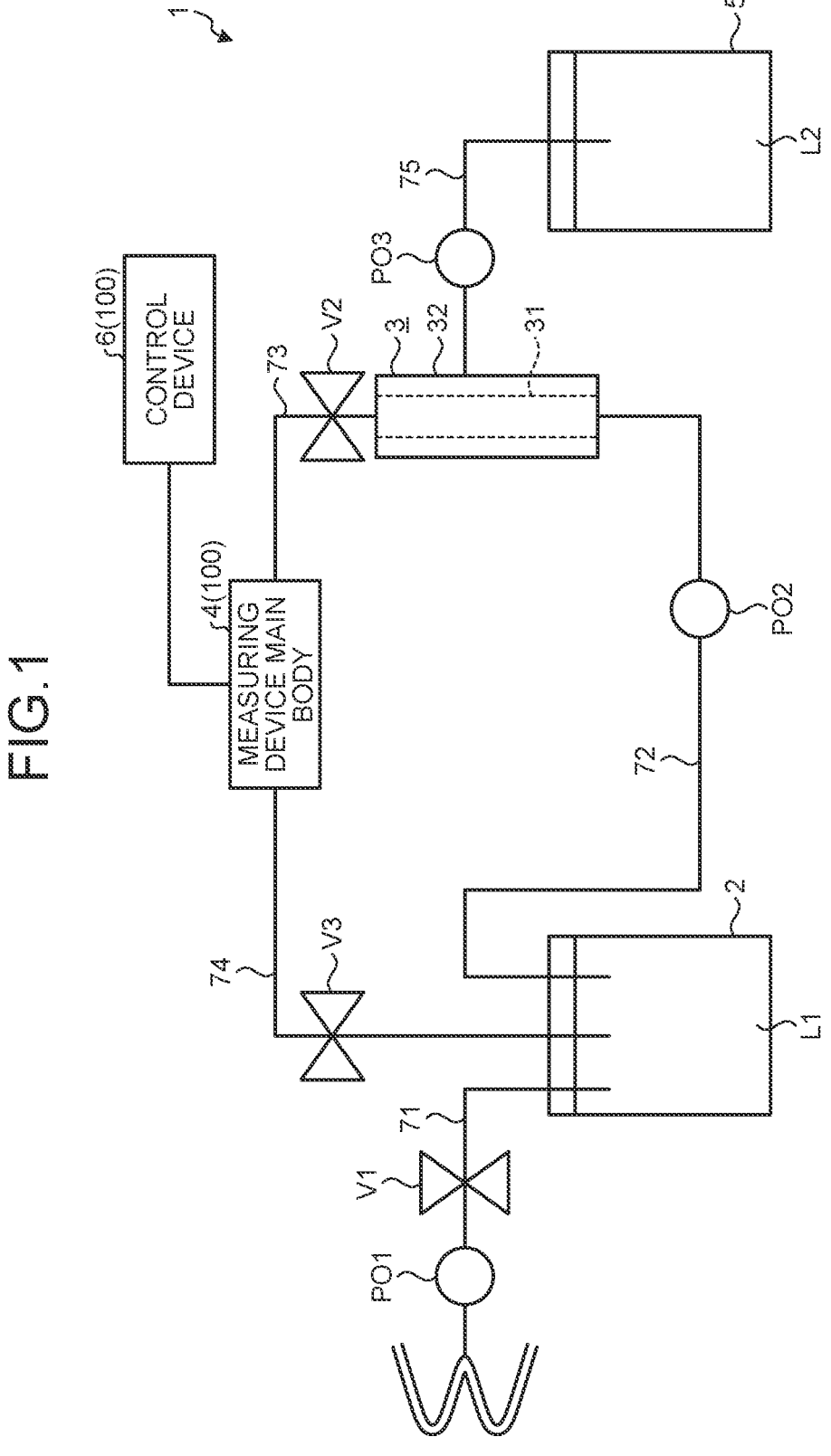
FIG. 1 is a diagram illustrating a configuration of a concentration adjustment device according to a first embodiment of the present disclosure.

Hereinafter, embodiments of the present disclosure will be described with reference to the drawings. Note that the present disclosure is not limited by the embodiments described below. Furthermore, in the description of the drawings, the same portions are denoted by the same reference numerals.

First Embodiment

[Schematic Configuration of Concentration Adjustment Device]

FIG. 1 is a diagram illustrating a configuration of a concentration adjustment device 1 according to a first embodiment of the present disclosure.

The concentration adjustment device 1 adjusts the concentration of the fluid containing the biological particle. Specifically, the concentration adjustment device 1 adjusts the concentration of the fluid to an appropriate concentration to be input to the biological sample analyzer 6100 (see FIG. 7). Note that the concentration adjustment device 1 and the biological sample analyzer 6100 may be directly connected by a tube, and the fluid whose concentration is adjusted by the concentration adjustment device may be input to the biological sample analyzer 6100 through the tube. Alternatively, the fluid whose concentration has been adjusted by the concentration adjustment device may be taken out from the concentration adjustment device and input to the biological sample analyzer 6100. In the first embodiment, the biological sample analyzer 6100 is an apparatus used for cell therapy, and a detailed configuration thereof will be described later in "Configuration of Biological Sample Analyzer" section. In the first embodiment, the fluid is a cell suspension stained with an antibody dye (labeled with a labeling substance). That is, the concentration adjustment device 1 aseptically adjusts the cell concentration in the cell suspension to an appropriate cell concentration to be introduced into the biological sample analyzer 6100 described later without coming into contact with the cell suspension. As illustrated in FIG. 1, the concentration adjustment device 1 includes a cell suspension container 2, a hollow fiber module 3, a measurement device main body 4, a waste liquid container 5, a control device 6, pipes 71 to 75, pumps PO1 to PO3, and valves V1 to V3.

As illustrated in FIG. 1, the cell suspension container 2 accommodates the cell suspension L1.

The pipe 71 is connected to the cell suspension container 2. Then, under the control of the control device 6, the valve V1 disposed on the pipe 71 is opened and the pump PO1 is driven, whereby the cell suspension L1 is supplied into the cell suspension container 2 via the pipe 71.

The pipes 72 and 74 are connected to the cell suspension container 2. Further, the cell suspension container 2 is disposed on an annular flow path formed by the pipe 72, the hollow fiber module 3, the pipe 73, the measurement device main body 4, the pipe 74, the cell suspension container 2, and the pipe 72. Then, under the control of the control device 6, the valve V2 disposed on the pipe 73 and the valve V3 disposed on the pipe 74 are opened, and the pump PO2 disposed on the pipe 72 is driven, whereby the cell suspension L1 in the cell suspension container 2 flows following the annular flow path.

As illustrated in FIG. 1, the hollow fiber module 3 includes a hollow fiber membrane 31 and an outer tube 32 accommodating the hollow fiber membrane 31. Although only one hollow fiber membrane 31 is illustrated inside the outer tube 32 in FIG. 1, in reality, a plurality of hollow fiber membranes 31 are accommodated in the outer tube 32.

The hollow fiber membrane 31 is a membrane formed to have a straw shape and having a hollow inside, and has a large number of pores smaller than the cells in the cell suspension L1 on the surface. The hole lets through unbound antibody dye and the like, but not the cells.

The pipe 75 is connected to the hollow fiber module 3. Then, when the pump PO3 arranged on the pipe 75 is driven under the control of the control device 6, and the cell suspension L1 flows through the hollow fiber membrane 31 following the above-described annular flow path, the unbound antibody dye and the like in the cell suspension L1 are discharged to the outside of the hollow fiber membrane 31 while the cells in the cell suspension L1 remain in the hollow fiber membrane 31. The unbound antibody dye and the like discharged to the outside of the hollow fiber membrane 31 are discharged into the waste liquid container 5 through the pipe 75.

The measurement device main body 4 is for measuring the cell concentration in the cell suspension L1 circulating following the above-described annular flow path.

The detailed configuration of the measurement device main body 4 will be described in "Configuration of measurement device Main Body" section presented later.

As illustrated in FIG. 1, the waste liquid container 5 stores the waste liquid L2 such as unbound antibody dye discharged to the outside of the hollow fiber membrane 31.

The control device 6 includes a controller such as a central processing unit (CPU) or a micro processing unit (MPU), or an integrated circuit such as an application specific integrated circuit (ASIC) or a field programmable gate array (FPGA). Then, the control device 6 adjusts the cell concentration by calculating the cell concentration in the cell suspension L1 on the basis of the detection result of the measurement device main body 4 and controlling the operations of the pumps PO1 to PO3 and the valves V1 to V3 as described above.

That is, the control device 6 corresponds to a control unit according to the present disclosure. The measurement device main body 4 and the control device 6 correspond to the concentration measurement device 100 (FIG. 1) according to the present disclosure.

[Configuration of Measurement Device Main Body]

Figure 2:
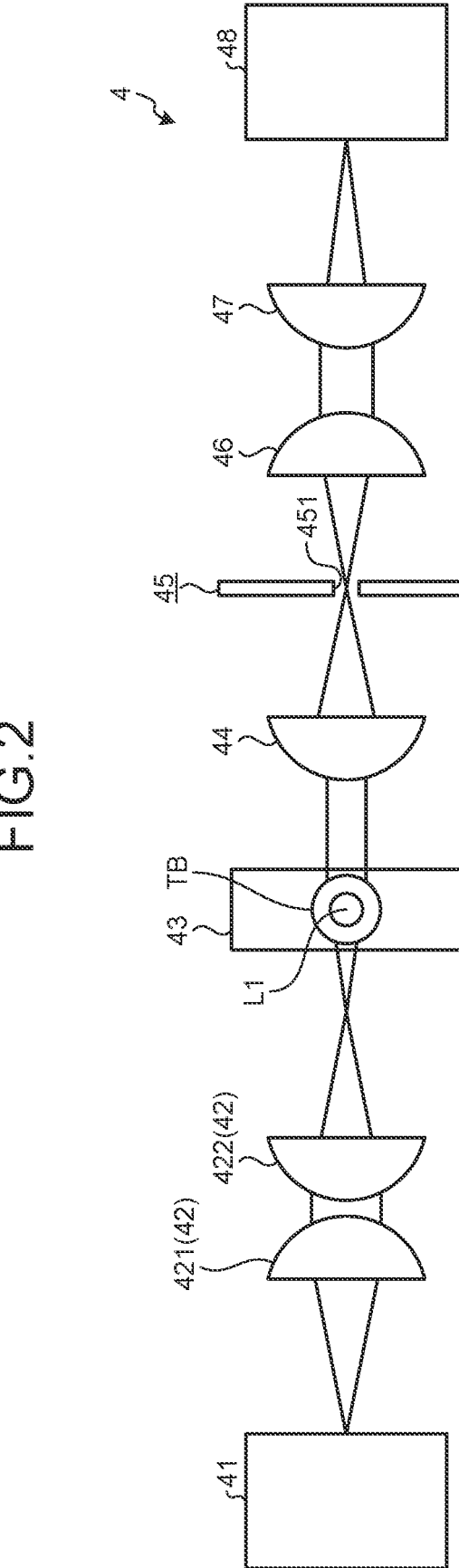
FIG. 2 is a diagram illustrating a configuration of a measurement device main body.

FIG. 2 is a diagram illustrating a configuration of the measurement device main body 4.

As illustrated in FIG. 2, the measurement device main body 4 includes a light source 41, a first lens 421, a second lens 422, a tube TB, a tube holder 43, a third lens 44, a light shielding plate 45, a fourth lens 46, a fifth lens 47, and a detection unit 48.

The tube TB corresponds to a tubular body according to the present disclosure. That is, the tube TB is formed in a cylindrical shape and to be light-transmissive. As a material of the tube TB, a resin material such as polyvinyl chloride (PVC) can be exemplified. The tube TB constitutes a part of the annular flow path described above. That is, the cell suspension L1 circulates in the tube TB.

The light source 41 emits light toward the cell suspension L1 in the tube TB. In the first embodiment, the light source 41 emits light in a wavelength band of 700 nm or greater.

As illustrated in FIG. 2, the first lens 421 is disposed on the optical path rear stage side of the light source 41 and collimates the light emitted from the light source 41.

As illustrated in FIG. 2, the second lens 422 is disposed on the optical path rear stage side with respect to the first lens 421, and condenses parallel light through the first lens 421 at a position on the optical path front stage side with respect to the tube TB.

The first and second lenses 421, 422 described above correspond to the first optical system 42 (FIG. 2) according to the present disclosure.

Figure 3:
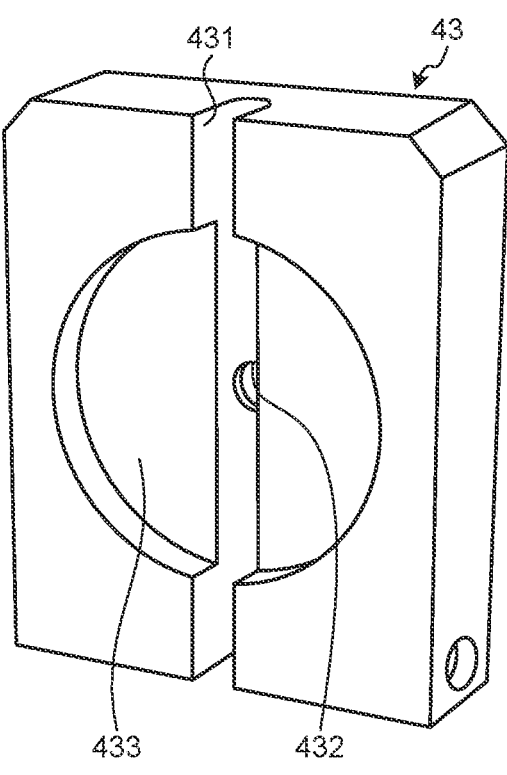
FIG. 3 is a diagram illustrating a tube holder.
Figure 4:
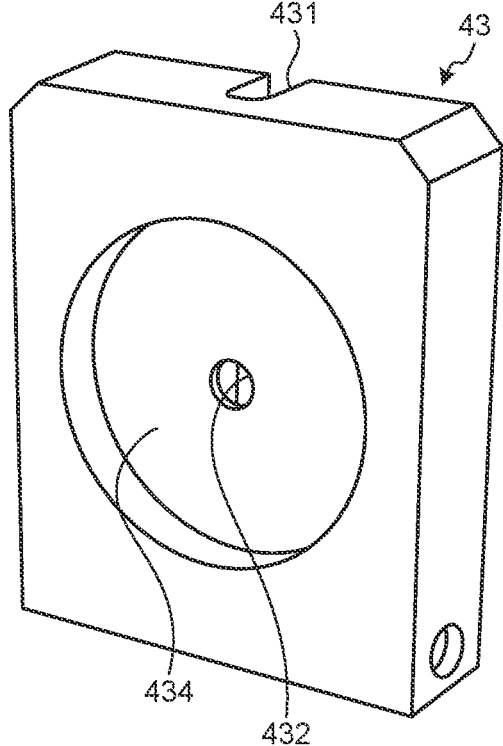
FIG. 4 is a diagram illustrating the tube holder.

FIGS. 3 and 4 are diagrams illustrating the tube holder 43. Specifically, FIG. 3 is a perspective view of the tube holder 43 as viewed from the optical path front stage side. FIG. 4 is a perspective view of the tube holder 43 as viewed from the optical path rear stage side.

As illustrated in FIG. 2, the tube holder 43 is disposed on the optical path rear stage side with respect to the first optical system 42. As illustrated in FIG. 3 or 4, the tube holder 43 is a plate body having a substantially rectangular shape in plan view, and is made of a light shielding material that shields light. The tube holder 43 holds the tube TB. The tube holder 43 is arranged in such a posture that each plate surface is substantially orthogonal to the optical axis of the light emitted from the light source 41.

In the tube holder 43, a tube groove portion 431 linearly extending in the vertical direction in FIG. 3 or 4 is formed on the plate surface on the optical path front stage side.

In addition, the tube holder 43 is formed with a through hole 432 that is located substantially at the center of the plate surface, through each plate surface, and communicates with the tube groove portion 431.

Furthermore, in the tube holder 43, circular recesses 433, 434 centered on the through hole 432 are formed on respective plate surfaces.

Then, the tube TB is held by the tube holder 43 in a state of being inserted into the tube groove portion 431. A part of the light through the tube TB passes through the through hole 432.

Here, the tube TB collimates the light incident on the side surface in a state where the cell suspension L1 circulates thereinside. Specifically, in the first embodiment, the tube TB functions as an optical element (cylindrical lens) that collimates the light transmitted through the tube TB in the plane orthogonal to the longitudinal direction of the tube TB, of the light through the first optical system 42. That is, the focal position of the tube TB (cylindrical lens) is set at the condensing position of the first optical system 42 (the focal position of the second lens 422).

As illustrated in FIG. 2, the light shielding plate 45 is disposed on the optical path rear stage side with respect to the tube holder 43. The light shielding plate 45 is a plate body and is made of a light shielding material that shields light. In addition, the light shielding plate 45 is arranged in such a posture that each plate surface is substantially orthogonal to the optical axis of the light emitted from the light source 41.

As illustrated in FIG. 2, an opening 451 that is through each plate surface is formed at a substantially central position of the light shielding plate 45.

As illustrated in FIG. 2, the third lens 44 is provided between the tube TB and the light shielding plate 45. The third lens 44 corresponds to a third optical system according to the present disclosure. That is, the third lens 44 condenses the parallel light through the tube TB on the opening 451.

As illustrated in FIG. 2, the fourth lens 46 is disposed on the optical path rear stage side with respect to the light shielding plate 45. The fourth lens 46 collimates the light condensed by the third lens 44 and passing through the opening 451.

As illustrated in FIG. 2, the fifth lens 47 is disposed on the optical path rear stage side with respect to the fourth lens 46. Then, the fifth lens 47 condenses the light collimated by the fifth lens 47 on the detection surface of the detection unit 48.

The detection unit 48 detects light through the cell suspension L1 in the tube TB (light through the fifth lens 47). In the first embodiment, the detection unit 48 includes a photodiode, and outputs a voltage corresponding to the amount of received light to the control device 6.

Then, the control device 6 calculates the cell concentration in the cell suspension L1 based on the voltage.

[Method for Calculating Cell Concentration]

Next, a method for calculating the cell concentration by the control device 6 will be described.

Figures 5, 6:
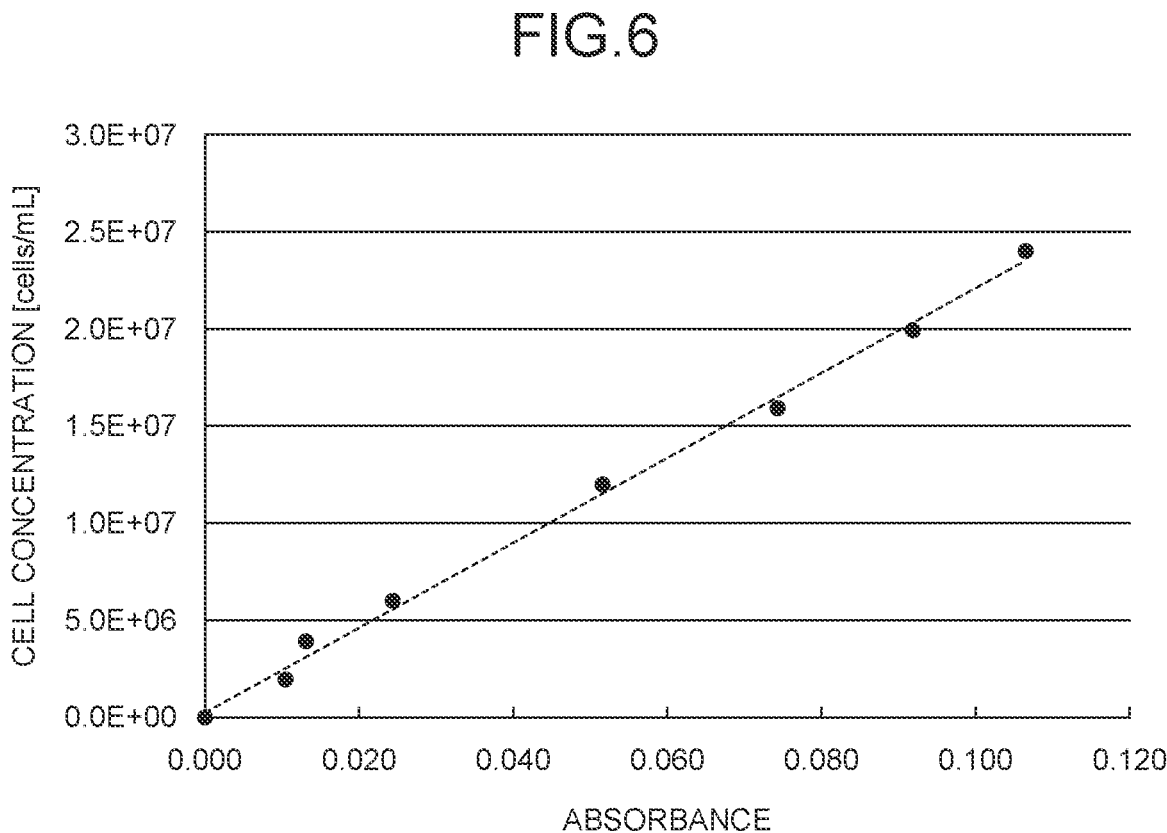
FIG. 5 is a diagram illustrating a method for calculating a cell concentration.
FIG. 6 is a diagram illustrating the method for calculating a cell concentration.

FIGS. 5 and 6 are diagrams for explaining a method for calculating the cell concentration.

According to the Beer-Lambert law, it is known that the absorbance of the cell suspension L1 is proportional to the cell concentration.

As illustrated in FIG. 5, the absorbance can be calculated based on the following formula (1) by measuring the incident light amount P0 and the transmitted light amount P1.

$$\text{Absorbance } (A) = -\log(T) \qquad (1)$$
$$= -\log\left(\frac{P1}{P0}\right)$$

Incidentally, the absorbance can be measured by the formula (1), but in this method, the absorbance of the tube TB is also reflected in the measurement result. Therefore, the control device 6 calculates the absorbance on the basis of the following formula (2), where V0 is the voltage detected by the detection unit 48 when the reference fluid L1 having a cell concentration of 0 (containing no cell) as a reference is put into the tube TB and measured, and V is the voltage detected by the detection unit 48 when the cell suspension L1 to be measured containing cells is put into the same tube TB and measured.

$$\text{Absorbance } (A) = \log\left(\frac{V0}{V}\right) \qquad (2)$$

Then, the control device 6 calculates the cell concentration in the cell suspension L1 by substituting the absorbance calculated by the formula (2) into the relational expression (hereinafter referred to as a calibration curve (see the following formula (3))) between the absorbance of the cell suspension L1 and the cell concentration.

The calibration curve is calculated in advance, for example as described below.

First, as shown in Table 1 below, eight types (samples Nos. 0 to 7) of cell suspensions L1 are prepared with different cell concentrations, including a cell suspension L1 (sample No. 0) with a cell concentration of 0 (step S1).

TABLE 1

| Sample No. | Cell concentration [cells/mL] | Voltage value [V] detected by detection unit 48 | Absorbance |
|---|---|---|---|
| 0 | 0 | 2.314 | 0.000 |
| 1 | 2.00E+06 | 2.259 | 0.010 |
| 2 | 4.00E+06 | 2.245 | 0.013 |
| 3 | 6.00E+06 | 2.188 | 0.024 |
| 4 | 1.20E+07 | 2.055 | 0.052 |
| 5 | 1.60E+07 | 1.951 | 0.074 |
| 6 | 2.00E+07 | 1.874 | 0.092 |
| 7 | 2.40E+07 | 1.812 | 0.106 |

Next, eight tubes TB each cut to about 10 cm are prepared, and the eight types of cell suspensions L1 (samples Nos. 0 to 7) prepared in step S1 are put into the eight tubes TB, and both ends of each tube TB are sealed (step S2).

Next, each tube TB (each tube TB containing eight types of cell suspension L1 (samples Nos. 0 to 7)) prepared in step S2 is installed in the measurement device main body 4, and the voltage value is measured by the detection unit 48 (step S3). The respective voltage values measured in step S3 are as shown in Table 1.

Next, the absorbance of each of the samples Nos. 0 to 7 is calculated by substituting each voltage value measured in step S3 into the formula (2) (step S4). The respective absorbances calculated in step S4 are as shown in Table 1.

Then, as illustrated in FIG. 6, an approximate straight line (a straight line indicated by a broken line in FIG. 6) is calculated from each cell concentration and each absorbance of the samples Nos. 0 to 7, and the approximate straight line is used as a calibration curve.

In the above example, the calibration curve is represented by the following formula (3).

$$\text{Cell concentration} = 2E8 \times \text{Absorbance} + 345660 \qquad (3)$$

[Configuration of Biological Sample Analyzer]

Next, a configuration of the biological sample analyzer 6100 will be described.

Figure 7:
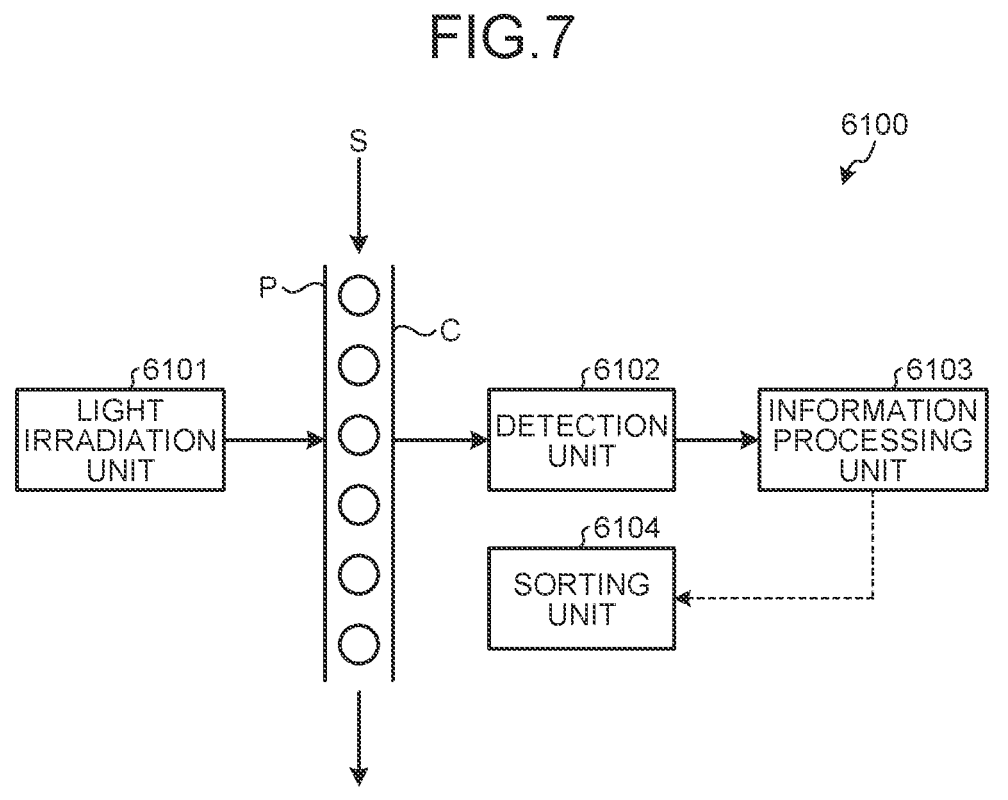

FIG. 7 shows an example configuration of a biological sample analyzer of the present disclosure. A biological sample analyzer 6100 shown in FIG. 7 includes: a light irradiation unit 6101 that irradiates a biological sample S flowing in a flow channel C with light; a detection unit 6102 that detects light generated by irradiating the biological sample S with light; and an information processing unit 6103 that processes information about the light detected by the detection unit. The biological sample analyzer 6100 is a flow cytometer or an imaging cytometer, for example. The biological sample analyzer 6100 may include a sorting unit 6104 that sorts out specific biological particles P in a biological sample. The biological sample analyzer 6100 including the sorting unit is a cell sorter, for example.

(Biological Sample)

The biological sample S may be a liquid sample containing biological particles. The biological particles are cells or non-cellular biological particles, for example. The cells may be living cells, and more specific examples thereof include blood cells such as erythrocytes and leukocytes, and germ cells such as sperms and fertilized eggs. Also, the cells may be those directly collected from a sample such as whole blood, or may be cultured cells obtained after culturing. The non-cellular biological particles are extracellular vesicles, or particularly, exosomes and microvesicles, for example. The biological particles may be labeled with one or more labeling substances (such as (particularly, a fluorescent dye) and a fluorochrome-labeled antibody). Note that particles other than biological particles may be analyzed by the biological sample analyzer of the present disclosure, and beads or the like may be analyzed for calibration or the like.

(Flow Channel)

The flow channel C is designed so that a flow of the biological sample S is formed. In particular, the flow channel C may be designed so that a flow in which the biological particles contained in the biological sample are aligned substantially in one row is formed. The flow channel structure including the flow channel C may be designed so that a laminar flow is formed. In particular, the flow channel structure is designed so that a laminar flow in which the flow of the biological sample (a sample flow) is surrounded by the flow of a sheath liquid is formed. The design of the flow channel structure may be appropriately selected by a person skilled in the art, or a known one may be adopted. The flow channel C may be formed in a flow channel structure such as a microchip (a chip having a flow channel on the order of micrometers) or a flow cell. The width of the flow channel C is 1 mm or smaller, or particularly, may be not smaller than 10 μm and not greater than 1 mm. The flow channel C and the flow channel structure including the flow channel C may be made of a material such as plastic or glass.

The biological sample analyzer of the present disclosure is designed so that the biological sample flowing in the flow channel C, or particularly, the biological particles in the biological sample are irradiated with light from the light irradiation unit 6101. The biological sample analyzer of the present disclosure may be designed so that the irradiation point of light on the biological sample is located in the flow channel structure in which the flow channel C is formed, or may be designed so that the irradiation point is located outside the flow channel structure. An example of the former case may be a configuration in which the light is emitted onto the flow channel C in a microchip or a flow cell. In the latter case, the biological particles after exiting the flow channel structure (particularly, the nozzle portion thereof) may be irradiated with the light, and a flow cytometer of a jet-in-air type can be adopted, for example.

(Light Irradiation Unit)

The light irradiation unit 6101 includes a light source unit that emits light, and a light guide optical system that guides the light to the irradiation point. The light source unit includes one or more light sources. The type of the light source(s) is a laser light source or an LED, for example. The wavelength of light to be emitted from each light source may be any wavelength of ultraviolet light, visible light, and infrared light. The light guide optical system includes optical components such as beam splitters, mirrors, or optical fibers, for example. The light guide optical system may also include a lens group for condensing light, and includes an objective lens, for example. There may be one or more irradiation points at which the biological sample and light intersect. The light irradiation unit 6101 may be designed to collect light emitted onto one irradiation point from one light source or different light sources.

(Detection Unit)

The detection unit 6102 includes at least one photodetector that detects light generated by emitting light onto biological particles. The light to be detected may be fluorescence or scattered light (such as one or more of the following: forward scattered light, backscattered light, and side scattered light), for example. Each photodetector includes one or more light receiving elements, and has a light receiving element array, for example. Each photodetector may include one or more photomultiplier tubes (PMTs) and/or photodiodes such as APDs and MPPCs, as the light receiving elements. The photodetector includes a PMT array in which a plurality of PMTs is arranged in a one-dimensional direction, for example. The detection unit 6102 may also include an image sensor such as a CCD or a CMOS. With the image sensor, the detection unit 6102 can acquire an image (such as a bright-field image, a dark-field image, or a fluorescent image, for example) of biological particles.

The detection unit 6102 includes a detection optical system that causes light of a predetermined detection wavelength to reach the corresponding photodetector. The detection optical system includes a spectroscopic unit such as a prism or a diffraction grating, or a wavelength separation unit such as a dichroic mirror or an optical filter. The detection optical system is designed to disperse the light generated by light irradiation to biological particles, for example, and detect the dispersed light with a larger number of photodetectors than the number of fluorescent dyes with which the biological particles are labeled. A flow cytometer including such a detection optical system is called a spectral flow cytometer. Further, the detection optical system is designed to separate the light corresponding to the fluorescence wavelength band of a specific fluorescent dye from the light generated by the light irradiation to the biological particles, for example, and cause the corresponding photodetector to detect the separated light.

The detection unit 6102 may also include a signal processing unit that converts an electrical signal obtained by a photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit 6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

Effects of First Embodiment

According to the first embodiment described above, the following effects are produced.

In the concentration measurement device 4 according to the first embodiment, the first optical system 42 condenses the light emitted from the light source 41 at a position on the optical path front stage side with respect to the tube TB. In other words, the tube TB is disposed at a position on the rear stage side with respect to the focal position of the first optical system 42. The tube TB functions as an optical element (cylindrical lens) that collimates the light transmitted through the tube TB in the plane orthogonal to the longitudinal direction of the tube TB, of the light through the first optical system 42.

Therefore, most of the light through the tube TB can be detected by the detection unit 48. That is, the amount of light detected by the detection unit 48 can be sufficiently secured, and the measurement accuracy of the cell concentration can be improved.

Incidentally, when the detection unit 48 detects scattering holes scattered in the cell suspension L1 in addition to the transmitted light transmitted through the tube TB (cell suspension L1), the absorbance cannot be calculated correctly. In the concentration measurement device 4 according to the first embodiment, the third lens 44 condenses the parallel light through the tube TB (cell suspension L1) into the opening 451 of the light shielding plate 45. Therefore, while the above-described transmitted light passes through the opening 451, the above-described scattered light is blocked by the light shielding plate 45. Therefore, the detection unit 48 can detect only the above-described transmitted light, whereby the absorbance can be correctly calculated.

Incidentally, as the antibody dye in the cell suspension L1, there are much antibody dye that emits fluorescence by being excited by light in any of wavelength bands around 405 nm, around 488 nm, around 561 nm, and around 638 nm (hereinafter referred to as an excitation wavelength). Therefore, when the concentration measurement device 4 is configured to emit light having the above-described excitation wavelength from the light source 41, the antibody dye fades, and fluorescence is not emitted even when the biological sample analyzer 6100 is irradiated with the light having the above-described excitation wavelength.

Here, in the concentration measurement device 4 according to the first embodiment, the light source 41 emits light in a wavelength band of 700 nm or greater. Therefore, when the concentration measurement device 4 measures the cell concentration in the cell suspension L1, the antibody dye does not fade.

Incidentally, in measuring the cell concentration in the cell suspension L1, red blood cells contained in the cell suspension L1 become a noise source, whereby it is difficult to correctly measure the absorbance. In addition, the absorption coefficients of deoxygenated hemoglobin and oxygenated hemoglobin in red blood cells are relatively low when the wavelength is 700 nm or greater.

Here, in the concentration measurement device 4 according to the first embodiment, the light source 41 emits light in a wavelength band of 700 nm or greater. Therefore, the influence of red blood cells contained in the cell suspension L1 on the absorbance can be reduced, whereby the absorbance can be accurately measured.

Incidentally, when the optical characteristics of the cell suspension L1 are measured through the tube TB, it is difficult to accurately measure the optical characteristics due to individual differences of the tube TB (variations in inner diameter and wall thickness of the tube TB).

In the concentration measurement device 4 according to the first embodiment, the absorbance is calculated on the basis of the formula (2), where V0 is a voltage detected by the detection unit 48 when the reference fluid L1, which is a reference having a cell concentration of 0 (containing no cell), is put into the tube TB and measured, and V is a voltage detected by the detection unit 48 when the cell suspension L1, which is a measurement target containing cells, is put into the same tube TB and measured. The individual difference of the tube TB can thus be canceled, whereby the absorbance and the cell concentration of the cell suspension L1 to be measured can be accurately measured.

Second Embodiment

Next, a second embodiment will be described.

Hereinafter, the same configurations as those of the above-described first embodiment are denoted by the same reference numerals, and the detailed description thereof will be omitted or simplified.

Figure 8:
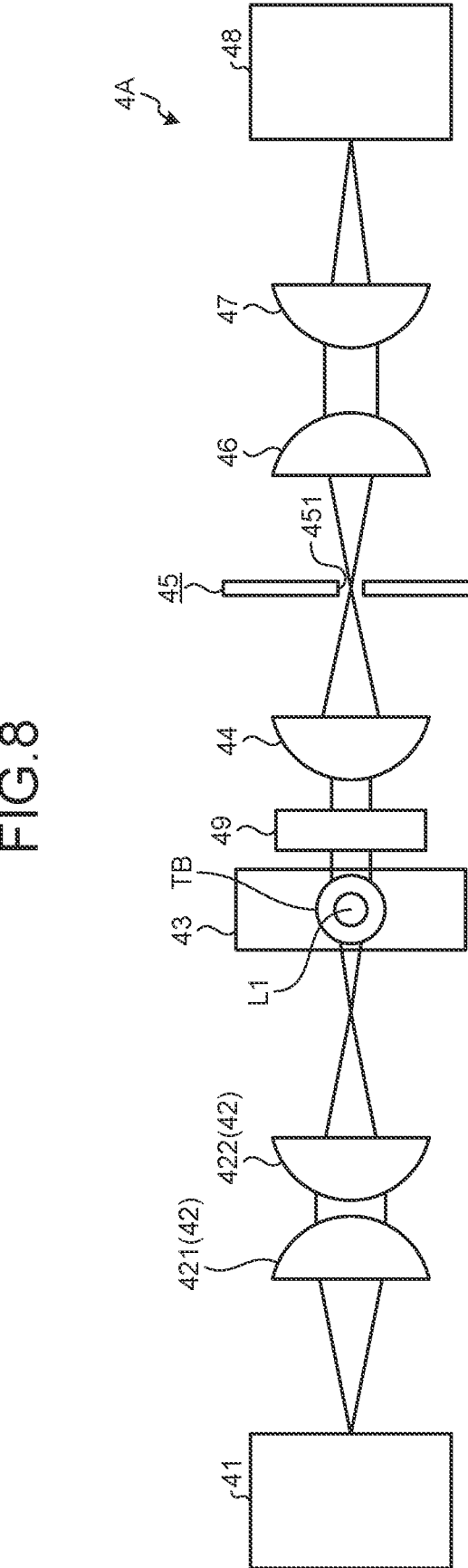
FIG. 8 is a diagram illustrating a configuration of a measurement device main body according to a second embodiment of the present disclosure.

FIG. 8 is a diagram illustrating a configuration of a measurement device main body 4A according to the second embodiment of the present disclosure.

In the measurement device main body 4A according to the second embodiment, as illustrated in FIG. 8, a sixth lens 49 is added to the measurement device main body 4 described in the first embodiment.

Figure 9:
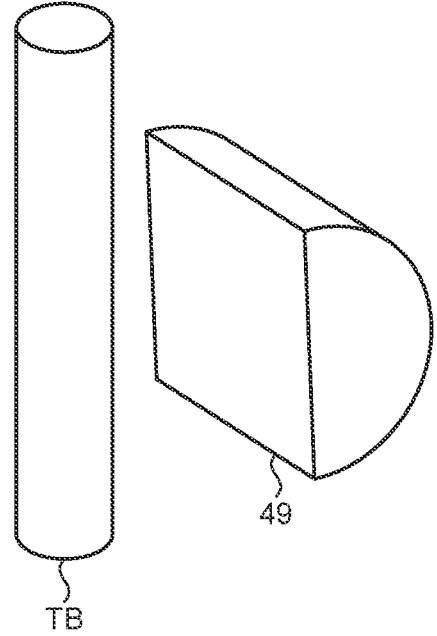
FIG. 9 is a diagram illustrating a sixth lens.

FIG. 9 is a diagram illustrating the sixth lens 49. As illustrated in FIG. 8, the sixth lens 49 is disposed between the tube holder 43 and the third lens 44. The sixth lens 49 corresponds to a second optical system according to the present disclosure. That is, the sixth lens 49 functions as an optical element (cylindrical lens) that collimates the light passing through the tube TB in the plane including the longitudinal direction of the tube TB, of the light through the tube TB.

Effects of Second Embodiment

The measurement device main body 4A according to the second embodiment includes the sixth lens 49 that collimates the light through the tube TB in the plane including the longitudinal direction of the tube TB, of the light through the tube TB.

Therefore, by using in combination the tube TB and the sixth lens 49 that respectively function as cylindrical lenses, more light through the tube TB can be detected by the detection unit 48. That is, the amount of light detected by the detection unit 48 can be more favorably secured, and the measurement accuracy of the cell concentration can be further improved.

Third Embodiment

Next, a third embodiment will be described.

Hereinafter, the same configurations as those of the above-described first embodiment are denoted by the same reference numerals, and the detailed description thereof will be omitted or simplified.

Figure 10:
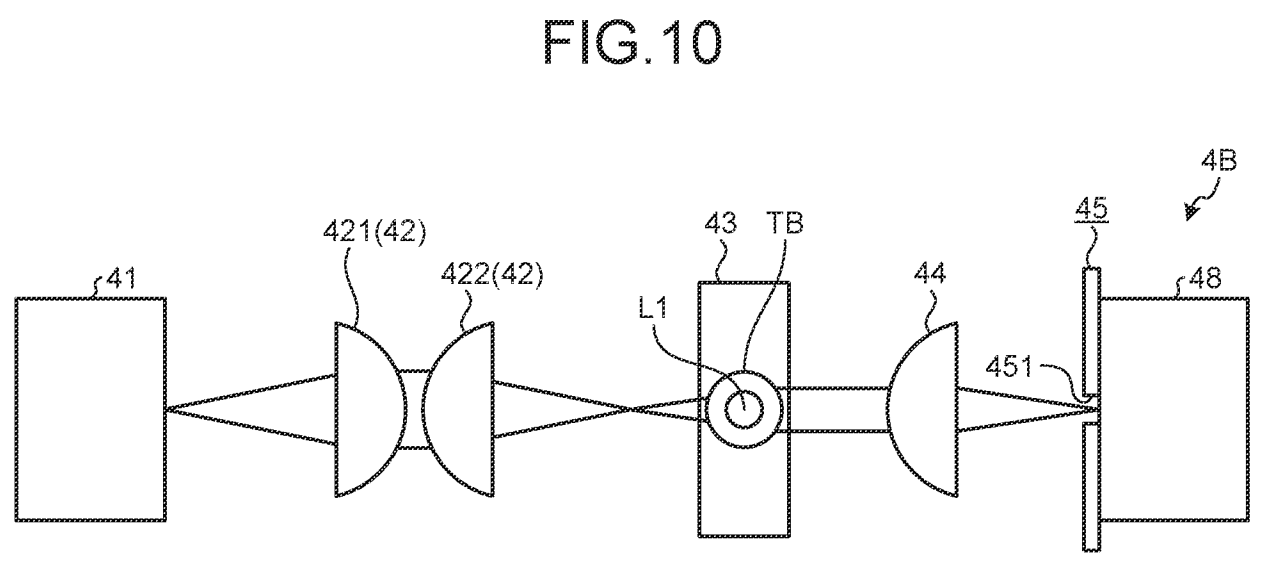

FIG. 10 is a diagram illustrating a configuration of a measurement device main body 4B according to the third embodiment of the present disclosure.

In the measurement device main body 4B according to the third embodiment, as illustrated in FIG. 10, the fourth and fifth lenses 46 and 47 are omitted from the measurement device main body 4 described in the first embodiment. In addition, the light shielding plate 45 is disposed in a state of being contact with the detection unit 48.

Effects of Third Embodiment

In the measurement device main body 4B according to the third embodiment, the fourth and fifth lenses 46 and 47 are omitted. Therefore, the configuration of the measurement device main body 4B can be simplified.

Fourth Embodiment

Next, a fourth embodiment will be described.

Hereinafter, the same configurations as those of the above-described second embodiment are denoted by the same reference numerals, and the detailed description thereof will be omitted or simplified.

Figure 11:
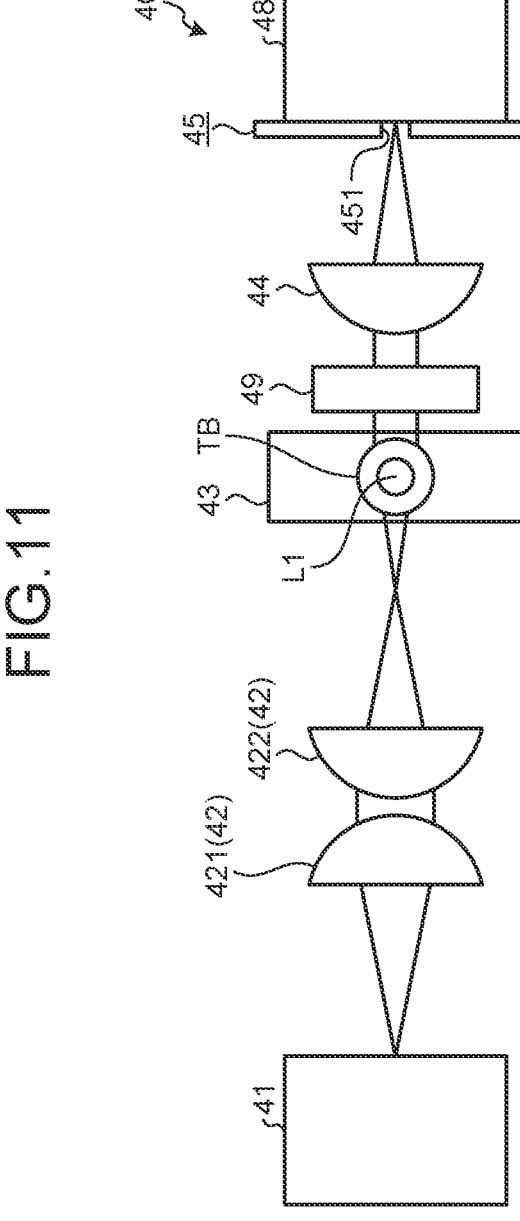
FIG. 11 is a diagram illustrating a configuration of a measurement device main body according to a fourth embodiment of the present disclosure.

FIG. 11 is a diagram illustrating a configuration of a measurement device main body 4C according to the fourth embodiment of the present disclosure.

In the measurement device main body 4C according to the fourth embodiment, as illustrated in FIG. 11, the fourth and fifth lenses 46 and 47 are omitted from the measurement device main body 4A described in the second embodiment. In addition, the light shielding plate 45 is disposed in a state of being contact with the detection unit 48.

Effects of Fourth Embodiment

In the measurement device main body 4C according to the fourth embodiment, the fourth and fifth lenses 46 and 47 are omitted. Therefore, the configuration of the measurement device main body 4C can be simplified.

Other Embodiments

Although the embodiments for carrying out the present disclosure have been described so far, the present disclosure should not be limited only by the first to fourth embodiments described above.

In the first to fourth embodiments described above, the configuration in which the cell concentration in the cell suspension L1 is aseptically adjusted is adopted as the concentration adjustment device 1, but the present invention is not limited thereto and a configuration in which the cell concentration is adjusted nonaseptically may be adopted. The configuration of the concentration adjustment device 1 is merely an example, and other configurations may be adopted.

Hardware Configuration

Figure 12:
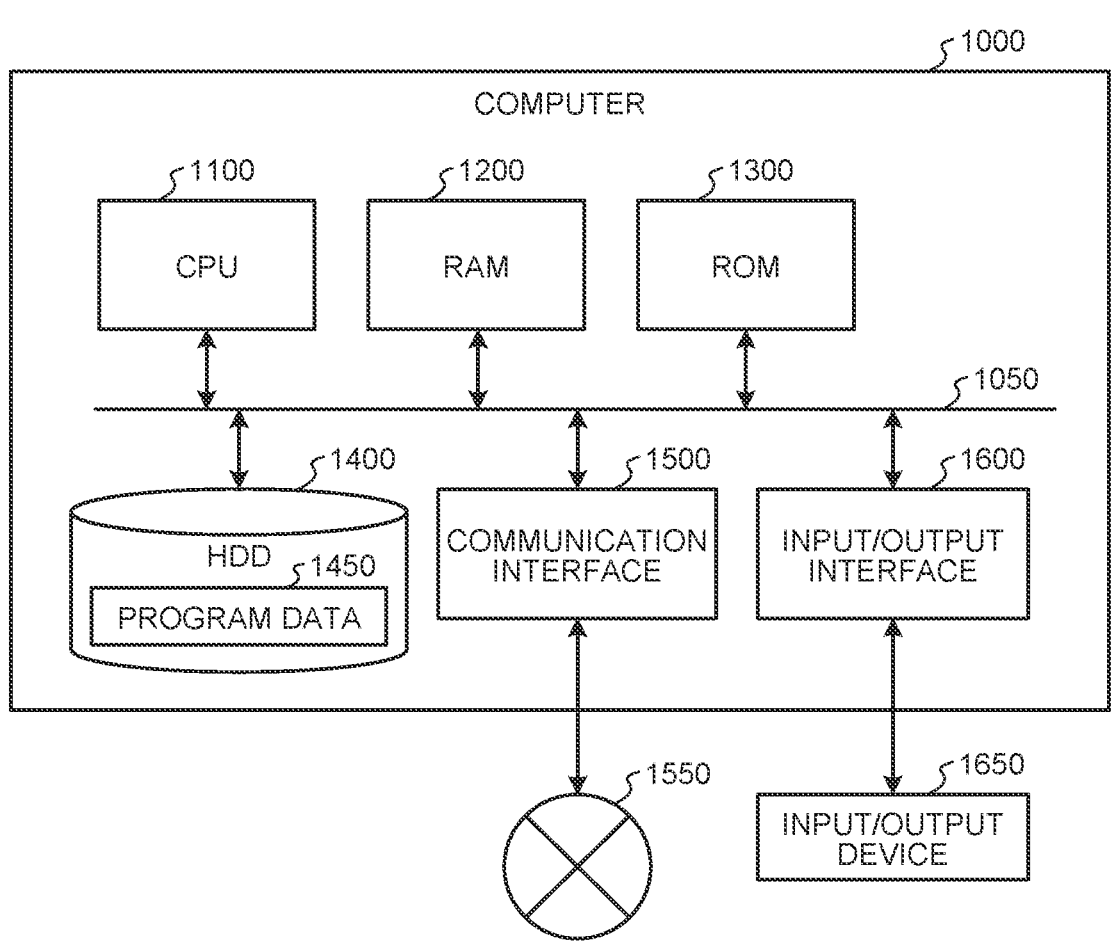
FIG. 12 is a hardware configuration diagram illustrating an example of a computer that implements functions of the control device according to the embodiment.

The control device 6 according to the embodiment, the modification thereof, and the application example described above can be realized by a computer 1000 having a configuration as illustrated in FIG. 12, for example. FIG. 12 is a hardware configuration diagram illustrating an example of the computer 1000 that implements the functions of the control device 6. The computer 1000 includes a CPU 1100, a RAM 1200, a read-only memory (ROM) 1300, a hard disk drive (HDD) 1400, a communication interface 1500, and an input/output interface 1600. Each component of the computer 1000 is connected by a bus 1050.

The CPU 1100 operates on the basis of a program stored in the ROM 1300 or the HDD 1400, to control each component. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 boots, a program that is dependent on hardware of the computer 1000, and the like.

The HDD 1400 is a computer-readable recording medium that non-transitorily records a program executed by the CPU 1100, data used by the program, and the like. Specifically, the HDD 1400 is a recording medium that records a program for executing each operation according to the present disclosure which is an example of the program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting the input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the control device 6 according to the above-described embodiment, the CPU 1100 of the computer 1000 implements the function of the control device 6 by executing a program loaded on the RAM 1200. In addition, the HDD 1400 stores a program and the like according to the present disclosure. Note that the CPU 1100 reads the program data 1450 from the HDD 1400 and executes the program data, but, as an alternative example, these programs may be acquired from another device via the external network 1550.

Note that the information processing unit 6103 constituting the biological sample analyzer 6100 can also be realized by a hardware configuration similar to that of the computer 1000 described above.

Furthermore, the effects described in the present specification are merely illustrative or exemplary, and are not limiting. That is, the technology according to the present disclosure can exhibit other effects obvious to those skilled in the art from the description of the present specification, together with or instead of the above effects.

Note that the following configurations are also encompassed in the technical scope of the present disclosure.

(1)

A concentration measurement device comprising:

a light source that emits light;

a first optical system that is provided on an optical path of the light emitted from the light source and condenses the light emitted from the light source;

a light-transmissive tubular body that is disposed at a position on a rear stage side with respect to a focal position of the first optical system on the optical path and collimates the light incident on a side surface in a state where a fluid flows inside; and

14 a detection unit that detects light through the tubular body.

(2)

The concentration measurement device according to (1), wherein the tubular body has a cylindrical shape, and collimates the light through the tubular body in a plane orthogonal to a longitudinal direction of the tubular body.

(3)

The concentration measurement device according to (1) or (2), further comprising a second optical system that is provided between the tubular body and the detection unit and collimates light through the tubular body in a plane including a longitudinal direction of the tubular body.

(4)

The concentration measurement device according to any one of (1) to (3), further comprising:

a light shielding plate that is provided between the tubular body and the detection unit and includes an opening that is through front and back surfaces; and a third optical system that is provided between the tubular body and the light shielding plate and condenses light through the tubular body on the opening.

(5)

The concentration measurement device according to (4), wherein the light shielding plate is in contact with an optical path front stage side of the detection unit.

(6)

The concentration measurement device according to any one of (1) to (5), wherein the fluid contains a biological particle.

(7)

The concentration measurement device according to (6), wherein the fluid is a cell suspension stained with an antibody dye.

(8)

The concentration measurement device according to any one of (1) to (7), wherein the light source emits light in a wavelength band of 700 nm or greater.

(9)

The concentration measurement device according to any one of (1) to (8), further comprising a control unit that calculates a concentration of the fluid from absorbance of the fluid according to the Beer-Lambert law, wherein the control unit calculates the absorbance from a detection result obtained by the detection unit detecting light through the tubular body in a state where a reference fluid having a concentration of 0 as a reference circulates in the tubular body and a detection result obtained by the detection unit detecting light through the tubular body in a state where the fluid to be measured circulates in the tubular body.

REFERENCE SIGNS LIST

1 CONCENTRATION ADJUSTMENT DEVICE
2 CELL SUSPENSION CONTAINER
3 HOLLOW FIBER MODULE
4, 4A to 4C MEASUREMENT DEVICE MAIN BODY
5 WASTE LIQUID CONTAINER
6 CONTROL DEVICE
31 HOLLOW FIBER MEMBRANE
32 OUTER TUBE
41 LIGHT SOURCE
42 FIRST OPTICAL SYSTEM
43 TUBE HOLDER
44 THIRD LENS
45 LIGHT SHIELDING PLATE

46 FOURTH LENS
47 FIFTH LENS
48 DETECTION UNIT
49 SIXTH LENS
71 to 75 PIPE
100 CONCENTRATION MEASUREMENT DEVICE
421 FIRST LENS
422 SECOND LENS
431 TUBE GROOVE
432 THROUGH HOLE
433, 434 RECESS
451 OPENING
1000 COMPUTER
1050 BUS
1100 CPU
1200 RAM
1300 ROM
1400 HDD
1450 PROGRAM DATA
1500 COMMUNICATION INTERFACE
1550 EXTERNAL NETWORK
1600 INPUT/OUTPUT INTERFACE
1650 INPUT/OUTPUT DEVICE
6100 BIOLOGICAL SAMPLE ANALYZER
6101 LIGHT IRRADIATION UNIT
6102 DETECTION UNIT
6103 INFORMATION PROCESSING UNIT
6104 SORTING UNIT
C FLOW CHANNEL
L1 CELL SUSPENSION
L2 WASTE LIQUID
P BIOLOGICAL PARTICLE
PO1 to PO3 PUMP
S BIOLOGICAL SAMPLE
TB TUBE
V1 to V3 VALVE

The invention claimed is:

1. A concentration measurement device, comprising:
a light source configured to emit light;
a first optical system configured to condense the emitted light, wherein
the first optical system is on an optical path of the emitted light;
a light-transmissive tubular body configured to collimate the condensed light incident on a side surface of the light-transmissive tubular body, wherein
a fluid is inside the light-transmissive tubular body, and
the light-transmissive tubular body is at a position on a rear stage side with respect to a focal position of the first optical system on the optical path; and
a detection unit configured to detect the light through the light-transmissive tubular body.

2. The concentration measurement device according to claim 1, wherein
the light-transmissive tubular body has a cylindrical shape, and the light-transmissive tubular body is further configured to collimate the light that is transmitted through the light-transmissive tubular body in a plane orthogonal to a longitudinal direction of the light-transmissive tubular body.

3. The concentration measurement device according to claim 1, further comprising:
a second optical system between the light-transmissive tubular body and the detection unit, wherein
the second optical system is configured to collimate the light transmitted through the light-transmissive tubular body in a plane including a longitudinal direction of the light-transmissive tubular body.

4. The concentration measurement device according to claim 1, further comprising:
a light shielding plate between the light-transmissive tubular body and the detection unit, wherein the light shielding plate includes an opening that is through a first surface of the light shielding plate and a second surface of the light shielding plate; and
a third optical system between the light-transmissive tubular body and the light shielding plate, wherein the third optical system is configured to condense the light through the light-transmissive tubular body on the opening.

5. The concentration measurement device according to claim 4, wherein the light shielding plate is in contact with an optical path front stage side of the detection unit.

6. The concentration measurement device according to claim 1, wherein the fluid contains a biological particle.

7. The concentration measurement device according to claim 6, wherein the fluid is a cell suspension stained with an antibody dye.

8. The concentration measurement device according to claim 1, wherein the light source is further configured to emit the light in a wavelength band of 700 nm or greater.

9. The concentration measurement device according to claim 1, further comprising:
a control unit configured to calculate a concentration of the fluid based on absorbance of the fluid, wherein
the absorbance of the fluid is based on Beer-Lambert law,
the detection unit is further configured to detect the light through the light-transmissive tubular body having a reference fluid, to obtain a first detection result,
the reference fluid has a concentration of 0,
the detection unit is further configured to detect the light through the light-transmissive tubular body having the fluid, to obtain a second detection result, and
the control unit is further configured to calculate the absorbance from the first detection result and the second detection result.

* * * * *